United States Patent
Sakata (10) Patent No.: US 7,360,848 B2
(45) Date of Patent: Apr. 22, 2008

(54) PARALLEL RELAY CIRCUIT FOR HYDRAULIC BRAKING DEVICE

(75) Inventor: Yasunori Sakata, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 212 days.

(21) Appl. No.: 11/103,579

(22) Filed: Apr. 12, 2005

(65) Prior Publication Data

US 2005/0231029 A1    Oct. 20, 2005

(30) Foreign Application Priority Data

Apr. 16, 2004    (JP) .............................. 2004-121722

(51) Int. Cl.
*B60T 8/88*    (2006.01)
(52) U.S. Cl. ................. 303/122.05; 318/782; 318/434; 303/122.12
(58) Field of Classification Search .................. 303/11, 303/122.04, 122.05, 122.12, 115.4; 318/445, 318/543, 362, 258, 55–57, 703, 757, 761, 318/612, 261, 280
See application file for complete search history.

(56) References Cited

U.S. PATENT DOCUMENTS 5,156,449 A * 10/1992 Wetzel .................... 303/113.2
5,568,025 A * 10/1996 Sumida et al. .............. 318/287
5,927,832 A *  7/1999 Fulks et al. ................. 303/167
6,659,568 B2* 12/2003 Wandel ................... 303/115.4
6,851,760 B2*  2/2005 Ishida et al. .................. 303/11

FOREIGN PATENT DOCUMENTS

JP    A-2000-108887    4/2005

* cited by examiner

*Primary Examiner*—Robert A. Siconolfi
*Assistant Examiner*—Kochi Rashid
(74) *Attorney, Agent, or Firm*—Posz Law Group, PLC (57) ABSTRACT

In a parallel relay circuit, only one of a plurality of relays is turned on sequentially while turning the rest of the relays off. It is determined whether the motor is applied with voltage via a voltage detection resistor when each of the relays is turned on individually such that a disconnection abnormality in the respective relays is detected. As the disconnection abnormality in each of the relays can be detected individually, it is possible to detect a disconnection abnormality that has been occurred at least in a part of the relays, and to alert a driver for the abnormality.

13 Claims, 10 Drawing Sheets

PARALLEL RELAY CIRCUIT FOR HYDRAULIC BRAKING DEVICE

CROSS REFERENCE TO RELATED APPLICATION

This application is based upon and claims the benefit of Japanese Patent Application No. 2004-121722 filed on Apr. 16, 2004, the content of which are incorporated herein by reference.

FIELD OF THE INVENTION

The present invention relates to a parallel relay circuit for controlling power supply to a pressurizing unit that applies pressure to a servo unit equipped with a hydraulic braking device.

BACKGROUND OF THE INVENTION

In order to derive a boosting function from a servo unit equipped with a hydraulic braking unit, the control pressure of the servo unit has to be maintained to a desired value. For the purpose of maintaining the control pressure, the pressure of an accumulator that accumulates the control pressure of the servo unit is monitored. If the level of the monitored pressure of the brake fluid stored in the accumulator fails to reach the desired value, the motor is turned on to drive the pump that sucks and discharges the brake fluid from a master reservoir so as to be supplied to the accumulator.

The control of the power supply to the motor for adjusting the control pressure of the servo unit is executed through a relay circuit. The relay circuit is formed of a parallel relay circuit (fail-safe relay) in which two or more relays are connected in parallel in view of a fail-safe (redundancy) function.

In the case where the aforementioned parallel relay circuit is disconnected, the motor cannot be turned on, thus failing to derive the boosting function from the servo unit. It is, therefore, necessary to detect the disconnection of the relay circuit. Japanese Patent Publication Laid-Open No. 2000-108887 discloses an art for detecting disconnection of the parallel relay circuit based on a time period taken for charging the capacitor provided in the power supply line for the relays of the parallel relay circuit.

The art as disclosed in Japanese Patent Publication Laid-Open No. 2000-108887, however, fails to detect the disconnection that occurs in a part of relays of the parallel relay circuit. In case of the aforementioned partially disconnected relay circuit, it is possible to use the relay other than the disconnected one in the parallel relay circuit to drive the motor. In the aforementioned case, current is applied to the other relay for an elongated period of time, resulting in increased heat generation amount. Therefore, the disconnection that occurs in the part of the relays in the parallel relay circuit is desired to be detected.

SUMMARY OF THE INVENTION

It is an object of the present invention to detect disconnection of a part of relays in a parallel relay circuit.

According to a first aspect of the present invention, the parallel relay drive unit drives only one of the plurality of relays sequentially in a predetermined order for driving the motor while turning rest of the relays off, and the disconnection abnormality detection unit detects the disconnection abnormality of each of the plurality of relays individually by determining whether the voltage is applied to the motor when the one of the relays is driven.

A plurality of relays adds the redundancy to the function of the relay circuit. The relay circuit is structured such that each one of those relays is turned on in the predetermined order sequentially while turning the rest of the relays off so as to detect the disconnection abnormality in the respective relays individually. The disconnection that occurs in a part of the relays, thus, can be detected, and the driver may be alerted for the aforementioned disconnection abnormality.

Preferably, when the motor is driven upon decrease in the fluid pressure accumulated in the accumulating unit, which is detected by the pressure detection unit to be lower than the first predetermined value, the parallel relay drive unit turns all the plurality of relays on to apply the voltage to the motor until an elapse of a predetermined threshold value from a time at which the fluid pressure becomes lower than the first predetermined value, and the parallel relay drive unit turns only one of the relays and the rest of the relays off after the elapse of the predetermined threshold value.

A large amount of electricity is required as the starting current to drive the motor. During the starting period, all the relays are allowed to be turned on so as to apply sufficient voltage to the motor.

The parallel relay drive unit is structured to stop applying the voltage to the motor by turning the plurality of relays off when the fluid pressure accumulated in the accumulating unit becomes equal to or higher than a second predetermined value. The parallel relay drive is provided with a memory unit that stores one of the plurality of relays each designated with a corresponding number, which has been detected with respect to the disconnection abnormality. The memory unit stores the number of the relay that has been detected with respect to the disconnection abnormality in the last time when the fluid pressure becomes equal to or higher than the second predetermined value, and the relay with the number next to the number that has been stored in the memory unit is detected with respect to the disconnection abnormality subsequently when the fluid pressure becomes lower than the first predetermined value.

In the first aspect of the invention, the disconnection abnormality detection is performed with respect to the relay with the number next to the relay number that has been stored in the memory unit. Accordingly the disconnection abnormality detection can be uniformly performed for the respective relays.

The invention may be applied to the braking device provided with the parallel relay circuit according to the first aspect of the invention. In this case, it is possible to execute the vehicle braking control in accordance with the disconnection abnormality state of the relay.

In the aforementioned case, the parallel relay circuit may be provided with a disconnection display unit which displays that the disconnection abnormality in one of the plurality of relays has been detected by the disconnection abnormality detection unit.

When the brake fluid pressure control unit adjusts the brake fluid pressure, based on which the braking force generation unit generates the braking force so as to execute a vehicle control in accordance with a vehicle condition, a control inhibition display unit is provided for displaying a state where an execution of the vehicle control is inhibited when the disconnection abnormality detection unit detects the disconnection abnormality in one of the relays, and a number of the relays which have been detected as having no disconnection abnormality becomes smaller than a predetermined number of the relays required for executing the vehicle control.

In the aforementioned case where the vehicle control cannot be executed, such state can be displayed on the control inhibition display unit.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE
PREFERRED EMBODIMENTS

The present invention will be described further with reference to various embodiments in the drawings.

First Embodiment

Figure 1:
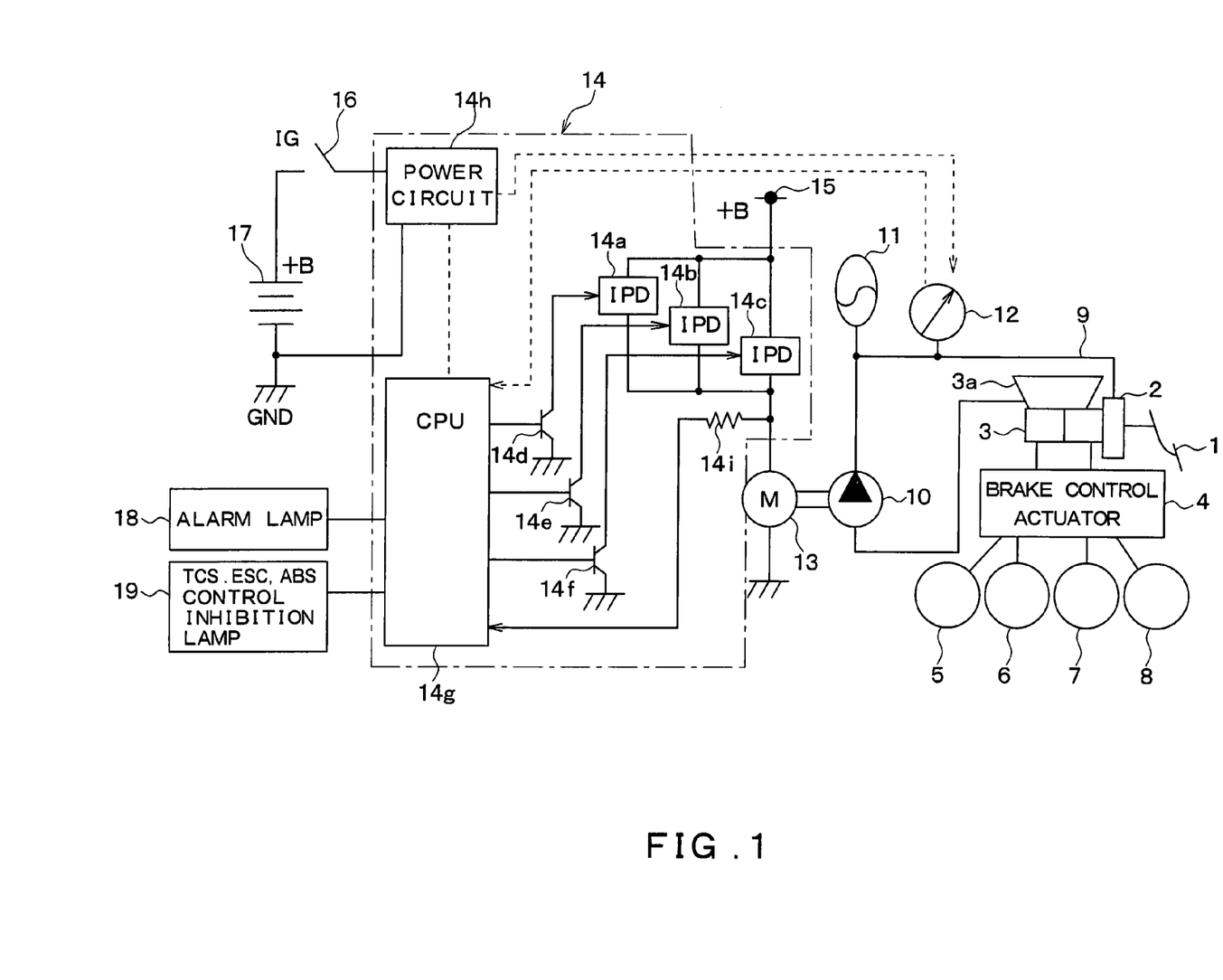
FIG. 1 is a view that represents a structure of a hydraulic braking device provided with a parallel relay circuit according to a first embodiment of the present invention as viewed in the cross section.

FIG. 1 is a schematic view showing a structure of a hydraulic braking device to which a parallel relay circuit according to a first embodiment of the present invention is applied. The structure of the braking device to which the parallel relay circuit is applied will be described referring to FIG. 1.

Referring to FIG. 1, a brake pedal 1 as a braking operation member that is depressed by a driver who intends to apply a braking force to a vehicle is connected to a servo unit 2 that serves as a brake fluid pressure generation source and a master cylinder 3. When the driver depresses the brake pedal 1, the pedal effort is boosted by the servo unit 2 and a master piston provided in the master cylinder 3 is depressed to generate a predetermined master cylinder pressure (hereinafter referred to as M/C pressure).

The master cylinder 3 is provided with a master reservoir 3a that includes passages communicated with a primary chamber and a secondary chamber of the master cylinder 3, respectively. The master reservoir 3a supplies the brake fluid into the master cylinder 3, and stores the surplus brake fluid in the master cylinder 3 through the respective passages.

The M/C pressure generated by the master cylinder 3 is applied to wheel cylinders 5, 6, 7, and 8, respectively each serving as a braking force generation member via a brake control actuator 4 driven by a brake ECU (not shown). As the piping arrangement in the brake control actuator 4 is the same as that in the generally employed actuator, the explanation with respect to the structure of the aforementioned brake control actuator, thus, will be omitted.

The servo unit 2 is structured to be applied with a desired pressure so as to provide the boosting function. That is, the master reservoir 3a is connected to the servo unit 2 via a pipe 9 in which a pump 10 and an accumulator 11 are disposed such that the pump 10 increases a fluid pressure within the accumulator 11 to a desired pressure, and the fluid pressure accumulated in the accumulator 11 is applied to the servo unit 2. A pressure sensor 12 disposed within the pipe 9 monitors the fluid pressure accumulated in the accumulator 11 such that the desired pressure is maintained.

The pump 10 for increasing the fluid pressure applied to the servo unit 2 is driven by a motor 13. A parallel relay circuit 14 of the present embodiment controls an ON/OFF state of power supply for driving the motor 13.

As shown in FIG. 1, the motor 13 is applied with +B voltage from a power source 15 such that the ON/OFF state of the power supply between the motor 13 and the power source 15 is controlled by the parallel relay circuit 14.

The parallel relay circuit 14 is formed of a plurality of relays 14a to 14c, a plurality of semiconductor switching elements 14d to 14f, a parallel relay drive CPU 14g, a power circuit 14h and a voltage detection resistor 14i.

The relays 14a to 14c are turned on by turning the corresponding semiconductor switching elements 14d to 14f on, respectively. Those relays 14a to 14c are connected in parallel with one another.

Each of the semiconductor switching elements 14d to 14f, which is formed as a transistor, for example, is controlled with respect to the ON/OFF state by the parallel relay drive CPU 14g.

The parallel relay drive CPU 14g is formed of a generally employed microcomputer including a first counter, memory and the like, which is operated upon power supply through the power circuit 14h, and controls the ON/OFF state of the plurality of semiconductor switching elements 14d to 14f so as to control the ON/OFF state of the corresponding relays 14a to 14c, respectively.

The parallel relay drive CPU 14g receives a detection signal from the pressure sensor 12, based on which the ON/OFF states of the plurality of semiconductor switching elements 14d to 14f are controlled so as to control the ON/OFF states of the relays 14a to 14c, respectively. More specifically when it is determined that the fluid pressure accumulated in the accumulator 11 is lower than a pump-ON pressure (first value) based on the detection signal of the pressure sensor 12, the semiconductor switching elements 14d to 14f are turned on so as to start the power supply to the motor 13. The pump 10 is operated to suck and discharge the brake fluid for the purpose of increasing the fluid pressure of the accumulator 11. When it is determined that the fluid pressure accumulated in the accumulator 11 exceeds a pump-OFF pressure (second value), the semiconductor switching elements 14d to 14f are turned off so as to stop pressurization by the pump 10.

The parallel relay drive CPU 14g receives a power supply detection signal via the voltage detection resistor 14i, which indicates whether the power supply to the motor 13 is performed.

The parallel relay drive CPU 14g is provided in a so called brake ECU. Various control routines executed by the brake ECU reflect the results of the control executed by the parallel relay drive CPU 14g.

The power circuit 14h serves to supply power to the parallel relay CPU 14g based on the +B voltage applied from the battery 17 when an ignition switch 16 is turned on.

The hydraulic braking device of the present embodiment is further provided with an alarm lamp 18 and a control inhibition lamp 19. These alarm lamp 18 and the control inhibition lamp 19 are driven by the parallel relay drive CPU 14g. The alarm lamp 18 is illuminated to indicate the disconnection or short-circuit in the plurality of relays 14a to 14c. The control inhibition lamp 19 is illuminated to alert that execution of the traction control (hereinafter referred to as the TCS), the side slip control (hereinafter referred to as the ESC), ABS control and the like is inhibited.

The operation of the parallel relay circuit in the above-structured hydraulic braking device will be described referring to the flowcharts of FIGS. 2 to 6.

Figure 2:
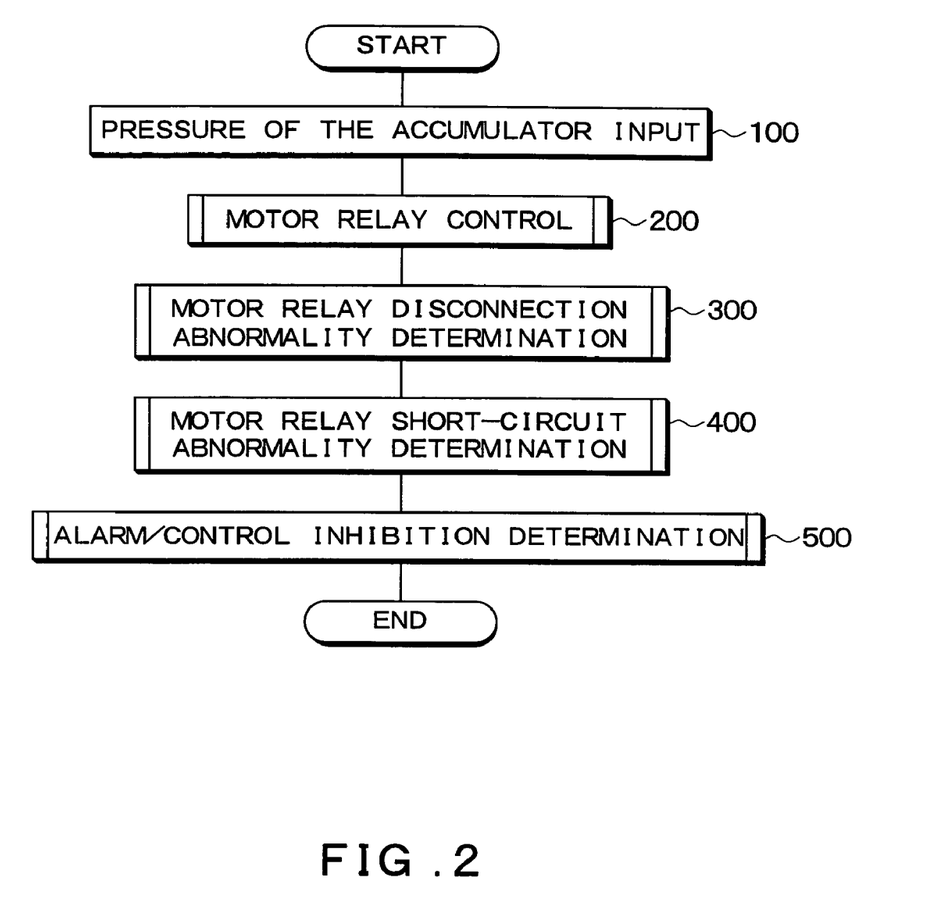
FIG. 2 is a flowchart of a main control routine executed by a parallel relay drive CPU in the parallel relay circuit.

FIG. 2 is a flowchart representing a main control routine executed by the parallel relay drive CPU 14g in the parallel relay circuit. Each routine shown in the flowchart will be executed at a predetermined control cycle, e.g., 10 ms.

At 100, the pressure of the accumulator 11 is detected by the pressure sensor 12, and the resultant detection signal is input to the parallel relay drive CPU 14g. The accumulated pressure of the accumulator 11 indicated by the detection signal of the pressure sensor 12 (hereinafter referred to as an Acc pressure) is stored in a memory equipped with the parallel relay drive CPU 14g, for example.

Figure 3A:
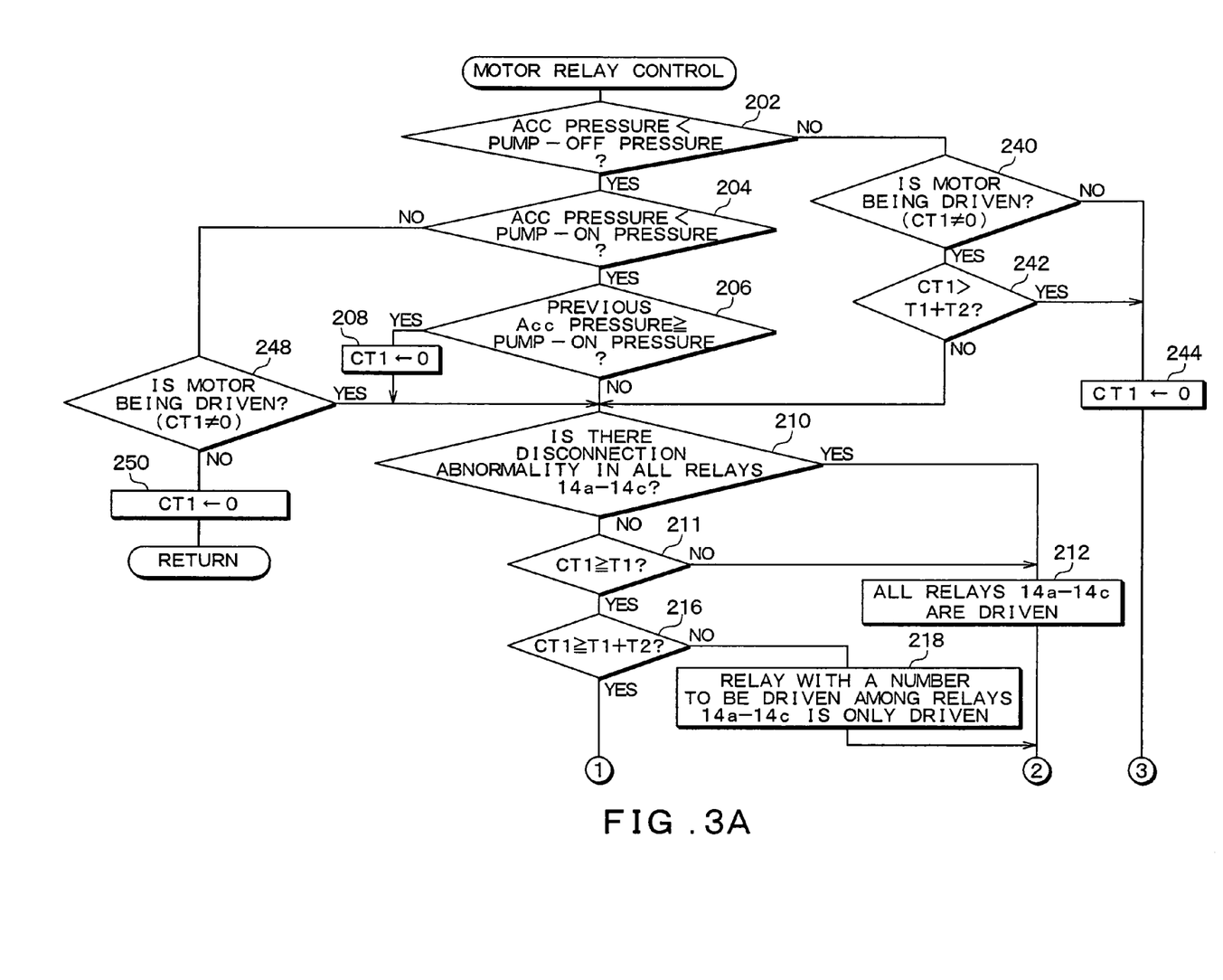
FIG. 3A is a flowchart representing a part of a motor relay control routine.
Figure 3B:
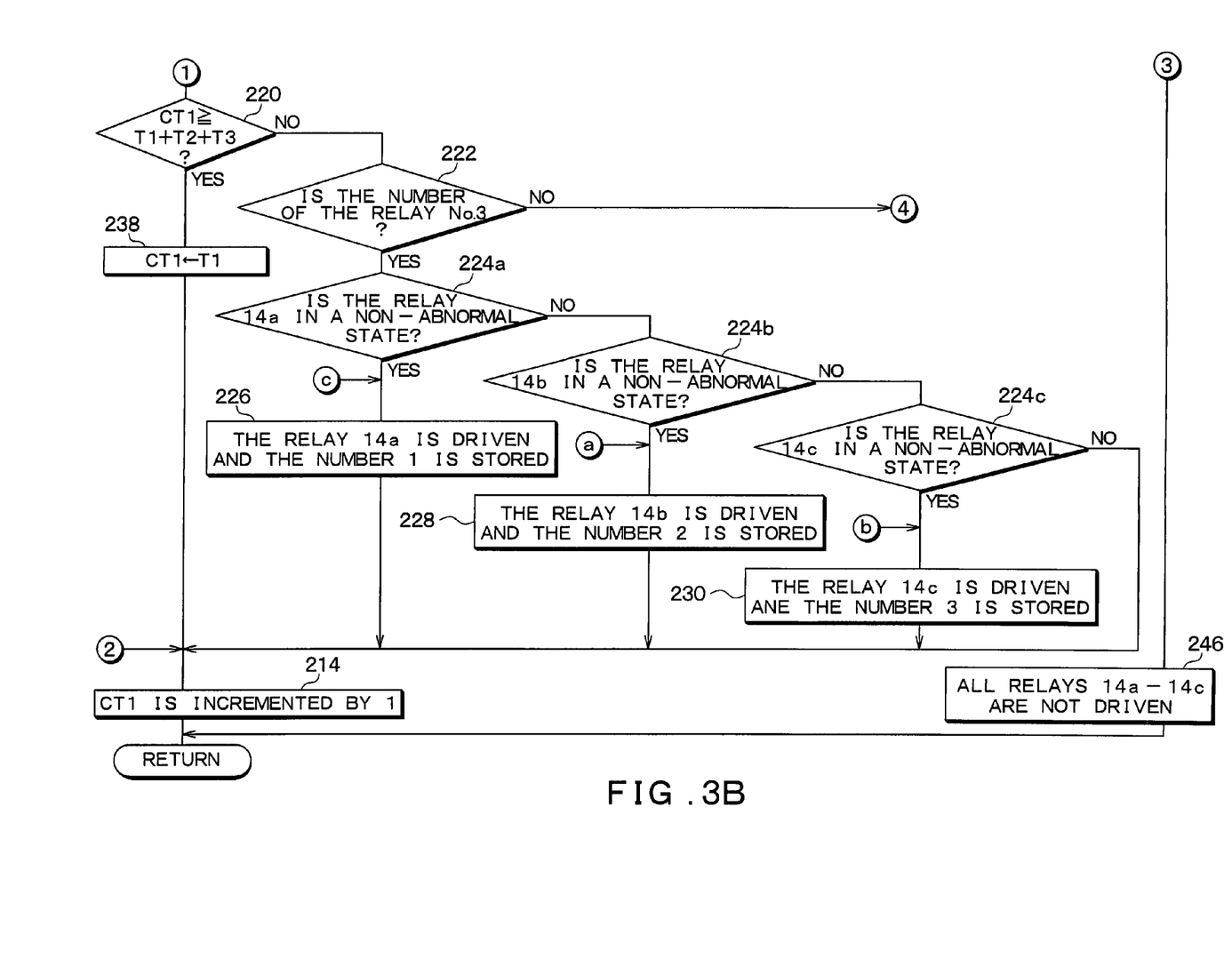
FIG. 3B is a flowchart representing a part of the motor relay control routine.
Figure 3C:
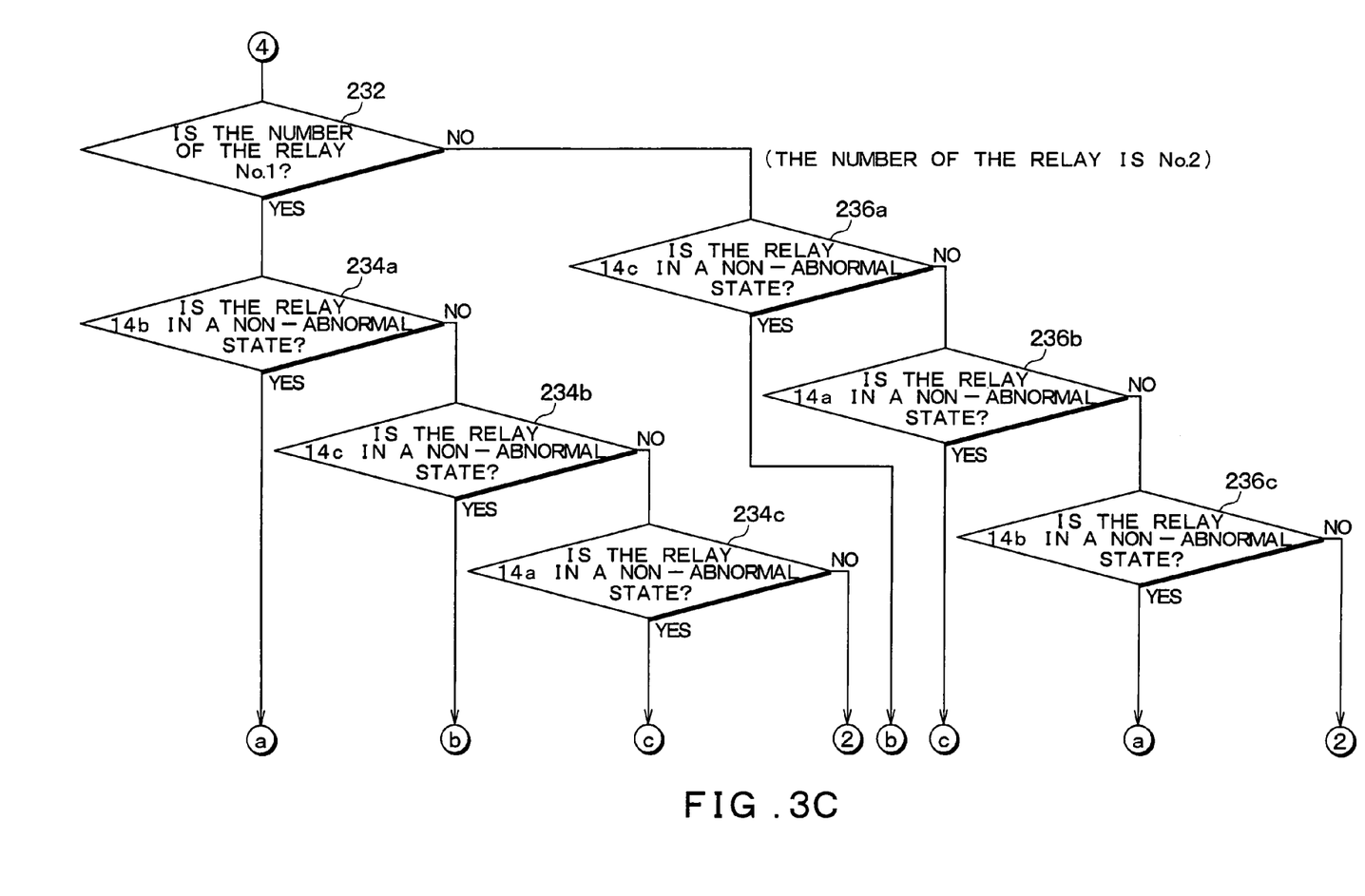
FIG. 3C is a flowchart representing a part of the motor relay control routine.

The process proceeds to a processing at a processing at 200 where a motor relay control is executed. FIGS. 3A to 3C show flowcharts that represent the detailed motor relay control routines, respectively.

Under the motor relay control, the relay to be driven is selected among the relays 14a to 14c in the parallel relay circuit, and the relay that is currently driven is stored in the memory.

At 202, it is determined whether the Acc pressure of the accumulator 11 is lower than the pump-OFF pressure at which the pump 10 is turned off. If the determination is affirmative, the process proceeds to a processing at a processing at 204 where it is determined whether the Acc pressure is lower than the pump-ON pressure.

If the determination is affirmative, it is considered that the Acc pressure of the accumulator 11 has to be increased by driving the pump 10. The process then proceeds to 206.

At 206, it is determined whether the previous Acc pressure becomes equal to or higher than the pump-ON pressure. The previous Acc pressure is read from the memory of the parallel relay drive CPU 14g, and is subjected to the determination whether it is equal to or higher than the pump-ON pressure. The memory in the parallel relay drive CPU 14g stores at least the previous value and the present value of the Acc pressure of the accumulator 11 so as to allow the aforementioned determination to be made herein.

If the determination is affirmative at 206, it is determined as being the first control timing since the Acc pressure of the accumulator 11 becomes lower than the pump-ON pressure. The process proceeds to a processing at a processing at 208 where a count value CT1 of the first counter in the parallel relay drive CPU 14g is reset to 0, and further proceeds to 210. Meanwhile If the determination is negative at 206, the process proceeds to a processing at a processing at 210.

At 210, it is determined whether there is a disconnection abnormality in all the relays 14a to 14c. If the determination is affirmative at 210, it may be determined that there is an abnormality in the motor 13, for example, disconnection of the voltage detection resistor 14i. The process then proceeds to 212. If the determination is negative, the process proceeds to a processing at a processing at 211.

At 211, it is determined whether the count value CT1 of the first counter, that is, the time elapsing from the timing at which the Acc pressure becomes lower than the pump-ON pressure is equal to or longer than a first threshold value T1. The threshold value T1 is set to the value about 350 ms in the present embodiment, for example. If the determination is negative, the process proceeds to a processing at a processing at 212 where all the relays 14a to 14c are driven. In other words, during the period for which the count value CT1 of the first counter is shorter than the first threshold value T1, all the relays 14a to 14c are driven so as to obtain substantially large amount of current for starting the motor 13 as the starting current. Upon establishment of the setting, the process proceeds to a processing at a processing at 214 where the count value CT1 of the first counter is incremented by 1. The routine is kept terminated until the next control cycle starting from 202 onward where various processings are executed repeatedly.

Meanwhile if the determination is affirmative at 211, the process proceeds to a processing at a processing at 216 where it is determined whether the count value CT1 is more than or equal to a second threshold value T1+T2 obtained by adding a predetermined value T2, for example, 400 ms to the first threshold value T1. If the determination is negative, the process proceeds to a processing at a processing at 218 where the relay with the number to be driven among those relays 14a to 14c is only driven.

The number of the relay to be driven is set in processing at 224, 228 and 232 to be described later. For example, the relay 14a is designated as the number 1, the relay 14b is designated as the number 2, and the relay 14c is designated as the number 3. As the number 1 is set in the initial setting, if the routine is first executed, the relay 14a with the number 1 will be driven.

The process then proceeds to 214 where the count value CT1 of the first counter is incremented by 1, and the process ends.

If the determination is affirmative at 216, the process proceeds to a processing at a processing at 220 where it is determined whether the count value CT1 is equal to or larger than a third threshold value T1+T2+T3 obtained by adding a predetermined value T3, for example, 10 ms that is a less than or equal to the control cycle, to the second threshold value T1+T2.

The predetermined value T3 represents an overlap period at which some of the relays 14a to 14c are simultaneously driven. The overlap period is set such that the voltage is smoothly applied to the motor 13 in consideration with the start-up period for driving the relays 14a to 14c. Accordingly, it is possible to omit the overlap period.

If the determination is negative at 220, the process proceeds to a processing at a processing at 222 where it is determined whether the number of the relay that is currently driven among those relays 14a to 14c is the number 3, that is, whether the relay 14c is currently driven. If the determination is affirmative, the process proceeds to a processing at a processing at 224a where it is determined whether the relay 14a with the number 1 has been in a non-abnormal state. Such determination is made based on an abnormality determination flag that is set when the abnormality in the respective relays 14a to 14c is detected by executing a motor relay disconnection abnormality determination routine (described later).

If the determination is affirmative at 224a, it is determined that no abnormality is detected in the relay 14a, and accordingly, it is possible to drive the relay 14a. The process proceeds to a processing at a processing at 226 where the relay 14a is driven and the number 1 corresponding to the relay that is currently driven among those relays 14a to 14c is stored in the memory by deleting the number that has been previously stored. Before the number 1 is stored, the number 3 has been stored in the memory as the initial value. If the abnormality in the relay 14a is not detected, YES is obtained at 222.

The process proceeds to a processing at a processing at 214 where the count value CT1 of the first counter is incremented by 1, and the process ends.

If the determination is negative at 224a, the process proceeds to a processing at a processing at 224b where it is determined whether the relay 14b with the number 2 has been in the non-abnormal state. The determination is made based on the abnormality determination flag that is set when the abnormality in the respective relays 14a to 14c is detected by executing the motor relay disconnection abnormality determination routine (described later).

If the determination is affirmative at 224b, it is determined that no abnormality is detected in the relay 14b, and accordingly it is possible to drive the relay 14b. The process proceeds to a processing at a processing at 228 where the relay 14b is driven and the number 2 corresponding to the relay that is currently driven among those 14a to 14c is stored in the memory by deleting the number that has been previously stored. The process then proceeds to 214 where the count value CT1 of the first counter is incremented by 1, and the process ends.

If the determination is negative at 224b, the process proceeds to a processing at a processing at 224c where it is determined whether the relay 14c with the number 3 has been in the non-abnormal state. The determination is made based on the abnormality determination flag that is set when the abnormality in the respective relays 14a to 14c is detected by executing the motor relay disconnection abnormality determination routine (described later).

If the determination is affirmative at 224c, it is determined that no abnormality is detected in the relay 14c, and accordingly, it is possible to drive the relay 14c. The process proceeds to a processing at a processing at 230 where the relay 14c is driven and the number 3 corresponding to the relay that is currently driven among those relays 14a to 14c is stored in the memory by deleting the number that has been previously stored. The process proceeds to a processing at a processing at 214 where the count value CT1 of the first counter is incremented by 1, and the process ends.

If all the determinations at 224a, 224b, and 224c result in NO, for example, abnormality is detected in all those relays 14a to 14c, the process proceeds to a processing at a processing at 214 where the count value CT1 of the first counter is incremented by 1, and the process ends.

If the determination is negative at 222, the process proceeds to a processing at a processing at 232 where it is determined whether the relay 14a with the number 1 among those relays 14a to 14c is currently driven. If the determination is affirmative, the same processing as executed at 224a to 224c is executed at 234a to 234c. As the relay 14a with the number 1 is currently driven, it is determined whether the relay 14b is in the non-abnormal state at 234a similar to that at 224b, and then, the same processing as executed at 224c is executed at 234b. At 234c, the same processing as executed at 224a is executed. The process proceeds to a processing at either one of processings at 226 to 230 depending on the determination results, or the process directly proceeds to 214. At 214, the count value CT1 of the first counter is incremented by 1, and the process ends.

If the determination is negative at 232, the same processing as at 224a to 224c is executed at 236a to 236c. As the relay 14b with the number 2 is currently driven, it is determined whether the relay 14c is in the non-abnormal state at 236a similar to that at 224c, and then, at 236b, the processing similar to that at 224a is executed. At 236c, the same processing as executed at 224b is executed. The process proceeds to a processing at either one of 226a to 236c depending on the determination results, or the process directly proceeds to 214. At 214, the count value CT1 of the first counter is incremented by 1, and the process ends.

Meanwhile at 220, if the count value CT1 becomes equal to or larger than the third threshold value T1+T2+T3, the process proceeds to a processing at a processing at 238 where the count value CT1 is reset to T1. Each processing from 222 to 236a-236c is repeatedly executed within a period during which the count value CT1 is in the range between the second threshold value T1+T2 and the third threshold value T1+T2+T3. In the case where no abnormality is detected in the respective relays 14a to 14c, when the processing is to be executed during the aforementioned period for the first time, affirmative determination will be obtained at both 222 and 224a. Accordingly the relay 14a with the number 1 is driven. When the processing is executed during the aforementioned period for the next time, affirmative determination will be obtained at both 232 and 234a. Accordingly the relay 14b with the number 2 is driven. When the processing is executed during the aforementioned period for the next time, affirmative determination will be obtained at 236a. Accordingly the relay 14c with the number 3 is driven.

If it is determined that the Acc pressure of the accumulator 11 is equal to or higher than the pump-OFF pressure at 202, it may be considered that the Acc pressure of the accumulator 11 has reached the desired fluid pressure. The process then proceeds to 240.

At 240, it is detected whether the motor 13 is being driven based on the determination whether the count value CT1 is set to 0. If the determination is affirmative, the process proceeds to a processing at 242 where it is determined whether the count value CT1 is larger than the second threshold value T1+T2. If the determination is negative, the relay currently being driven among those relays 14a to 14c is held on until the count value CT1 becomes larger than the second threshold value T1+T2. When the count value CT1 becomes larger than the second threshold value T1+T2, the process proceeds to a processing at 244 where the count value CT1 is reset to 0, and further proceeds to 246. At 246, driving of those relays 14a to 14c is inhibited.

If the determination is negative at 204, the process proceeds to a processing at 248 where it is determined whether the motor 13 is being driven based on the determination whether the count value CT1 is equal to 0. If the determination is affirmative, the process proceeds to a processing at 210 where the same processing is executed as described above. If the determination is negative, the process proceeds to a processing at 250 where the count value CT1 is reset to 0, and the process ends.

Figure 4:
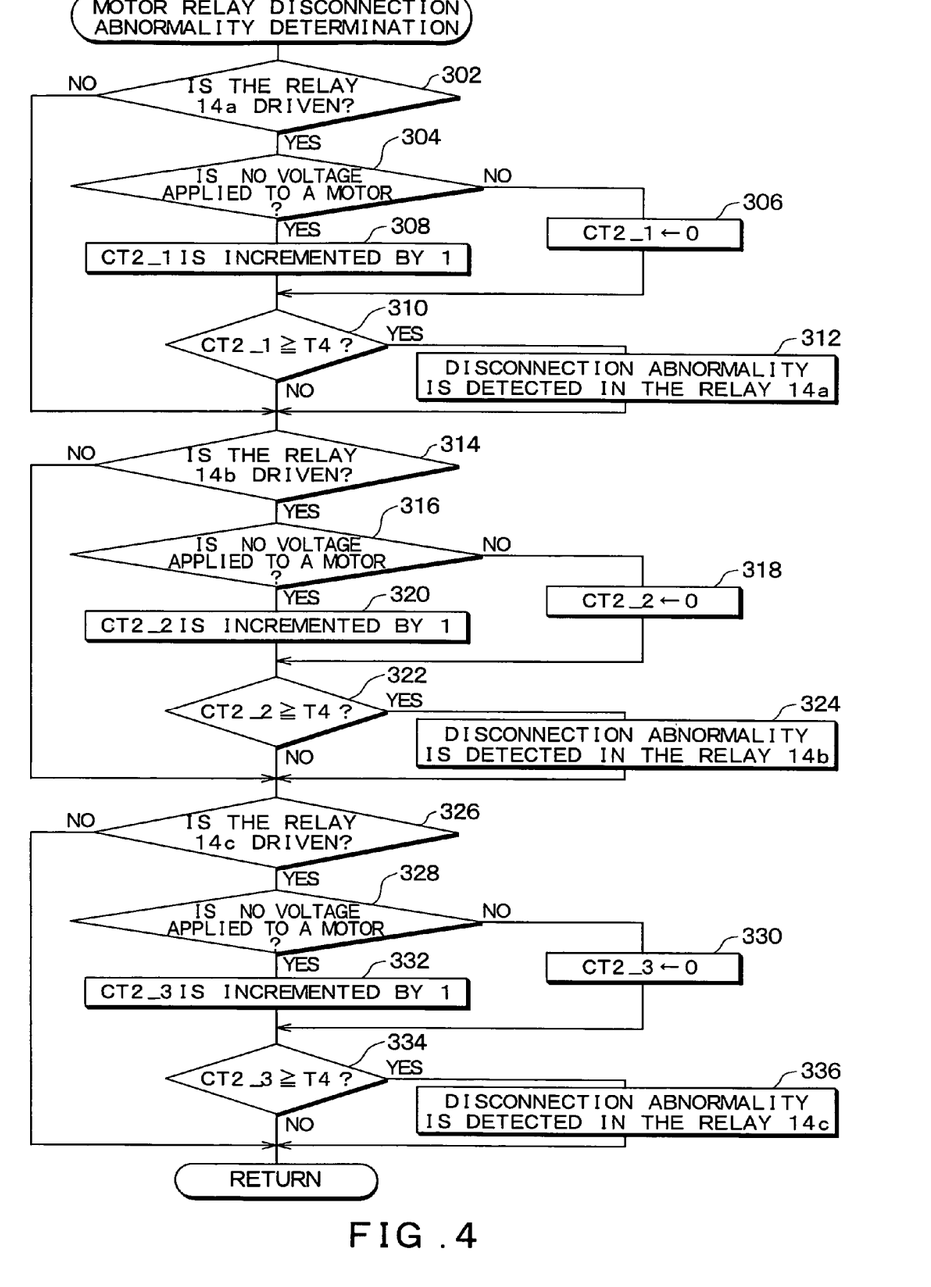
FIG. 4 is a flowchart representing a motor relay disconnection abnormality determination routine.

Upon termination of the motor relay control routine, the process proceeds to a processing at 300 as shown in the flowchart of FIG. 2 in which the motor relay disconnection abnormality determination control is executed. FIG. 4 shows a flowchart for executing the motor relay disconnection abnormality determination control.

Under the motor relay disconnection abnormality determination control, the determination is made whether a disconnection abnormality has occurred in each of the relays 14a to 14c.

At 302, it is determined whether the relay 14a with the number 1 is currently driven. The determination is made whether the number 1 corresponding to the relay 14a currently driven among those relays 14a to 14c has been stored in the memory at 226 to 230 as aforementioned.

If the determination is affirmative, the process proceeds to a processing at 304. At 304, it is determined whether voltage is applied to the motor 13 based on the determination whether the voltage signal has been input to the parallel relay CPU 14g from the voltage detection resistor 14i. The determination is made as the voltage is applied to the voltage detection resistor 14i if the pressure of the high voltage terminal of the motor 13 reaches the predetermined voltage. If it is determined that the voltage has been applied to the motor 13 based on the voltage signal, the process proceeds to a processing at 306 where a count value CT2_1 of a second counter provided in the parallel relay CPU 14g is reset. If it is determined that the voltage has not been applied, the process proceeds to a processing at 308 where the count value CT2_1 is incremented by 1.

The process proceeds to a processing at 310 where it is determined whether the count value CT2_1 becomes equal to or larger than a fourth threshold value T4, for example, 200 ms. The fourth threshold value T4 is set to the value that indicates the time at which the disconnection state occurs owing to the failure of the relay irrespective of the need to apply the voltage to the motor 13. Such time may not include the case of an instantaneous noise discontinuation.

If the determination is affirmative, the process proceeds to a processing at 312 where a disconnection detection flag indicating that the disconnection abnormality has been detected in the relay 14a is set. The process then proceeds to 314. If the determination is negative, the process proceeds to a processing at 314.

At 314 to 324, the same processing as executed at 302 to 312 is executed with respect to the relay 14b. If it is determined that the voltage is not applied to the motor 13 in this case, a count value CT2_2 of a third counter provided in the parallel relay CPU 14g is incremented sequentially. If the count value CT2_2 becomes equal to or larger than the fourth threshold value T4, it may be determined that the disconnection abnormality has occurred in the relay 14b, and thus, the disconnection detection flag is set.

Then at 326 to 336, the same processing as executed at 302 to 312 is executed with respect to the relay 14c. If it is determined that the voltage is not applied to the motor 13 in this case, a count value CT2_3 of a fourth counter provided in the parallel relay CPU 14g is incremented sequentially. If the count value CT2_3 becomes equal to or larger than the fourth threshold value T4, it may be determined that the disconnection abnormality has occurred in the relay 14c, and thus, the disconnection detection flag is set.

Figure 5:
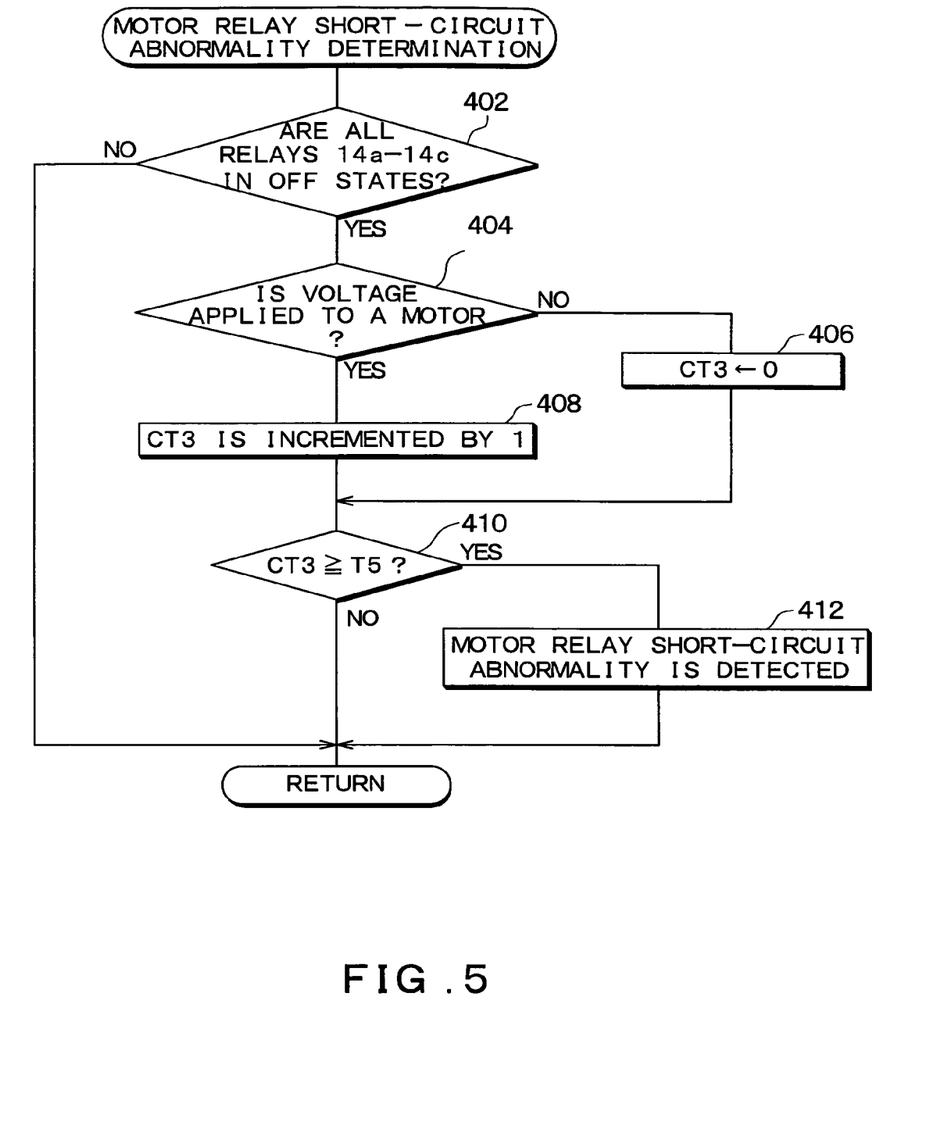
FIG. 5 is a flowchart representing a motor relay short-circuit abnormality determination routine.

Upon termination of the motor relay disconnection abnormality determination routine, the process proceeds to a processing at 400 as shown in the flowchart of FIG. 2 where the motor relay short-circuit abnormality determination routine is executed. The flowchart of FIG. 5 represents the control routine for the motor relay short-circuit abnormality determination routine.

Under the motor relay short-circuit abnormality determination routine, it is determined whether the voltage is applied to the motor 13 in spite of the off state of the relays 14a to 14c because of the short-circuit in the respective relays 14a to 14c.

At 402, it is determined whether all the relays 14a to 14c are in off states based on the flag that is set upon execution of the process for inhibiting driving of the relays 14a to 14c at 246 of the flowchart shown in FIG. 3.

If the determination is negative at 402, it is determined that there is no abnormality although the voltage is applied to the motor 13. Accordingly the motor relay short-circuit abnormality determination routine ends. If the determination is affirmative, the process proceeds to a processing at 404 where it is determined whether the voltage is applied to the motor 13 similar to that at 304 and the like under the motor relay disconnection abnormality determination routine.

If the determination is negative at 404, it is determined that no short-circuit abnormality occurs in the relays 14a to 14c, and a count value CT3 of a fifth counter provided in the parallel relay CPU 14g is reset. If the determination is affirmative, it is determined that there is a possibility of the short-circuit abnormality that occurs in some of the relays 14a to 14c. The process then proceeds to 408 where the count value CT3 of the fifth counter is incremented by 1.

At 410, it is determined whether the count value CT3 becomes equal to or larger than a fifth threshold value T5, for example, 2000 ms. The fifth threshold value T5 is set to the value that indicates the time at which the short-circuit abnormality state is determined because of application of the voltage to the motor 13 resulting from the failure in the relay in spite of the need of preventing the voltage application. The value may be set so as not to make a determination that the regenerative voltage is applied to the motor 13 until noise occurs or the motor 13 stops.

If the determination is affirmative at 410, the process proceeds to a processing at 412 where a short-circuit detection flag indicating the short-circuit abnormality is set, and the process ends.

Figure 6:
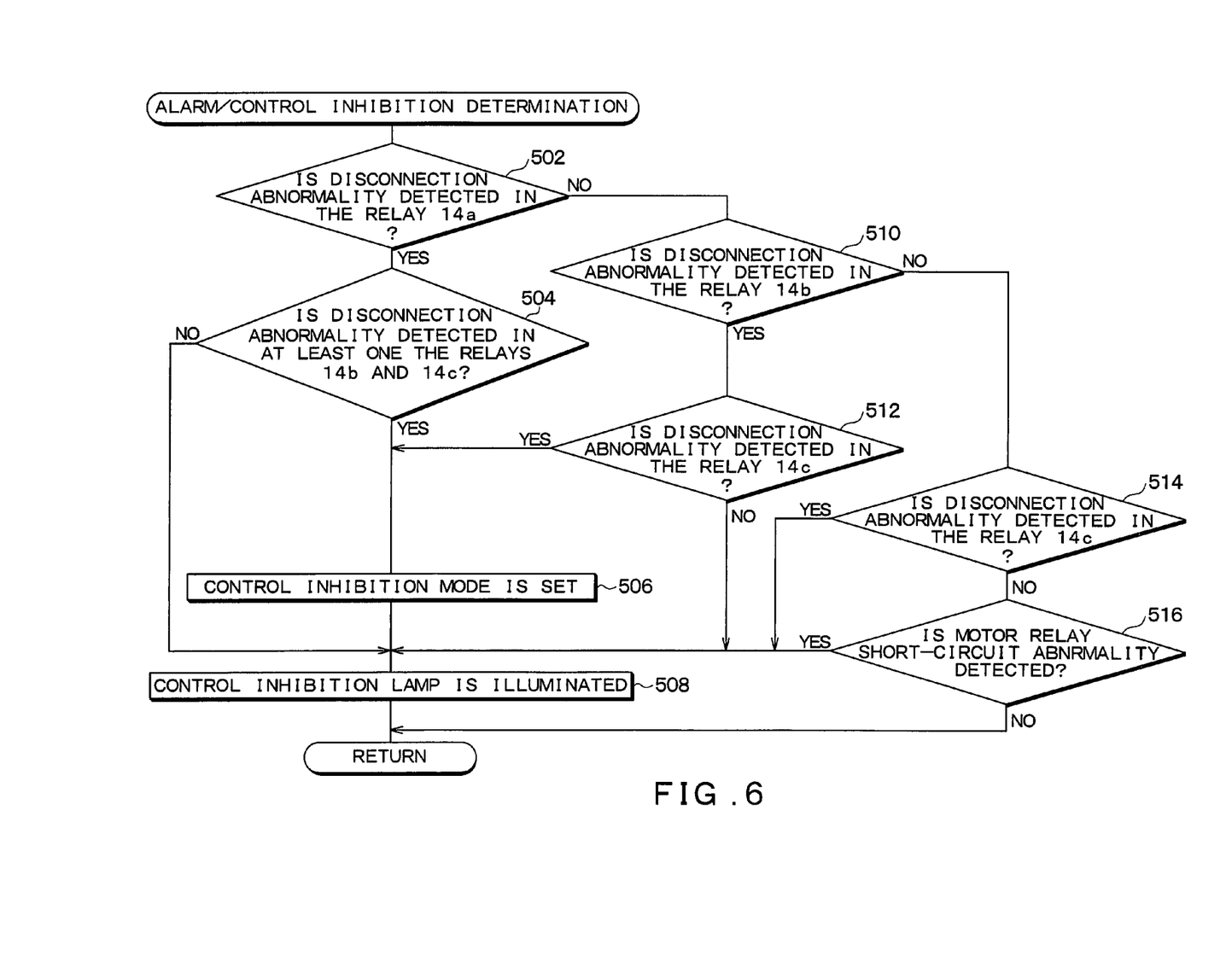
FIG. 6 is a flowchart representing an alarm/control inhibition determination routine.

Upon termination of the motor relay short-circuit abnormality determination control, the process proceeds to a processing at 500 where an alarm/control inhibition determination control is executed as shown in the flowchart of FIG. 2. FIG. 6 represents a flowchart for executing the alarm/control inhibition determination control.

Under the alarm/control inhibition determination control, when the failure occurs in the relays 14a to 14c, the driver is alerted for such failure by illumination of the alarm lamp 18, the determination is made with respect to inhibition of various control routines such as the TCS, ESC, and ABS control, and the driver is further alerted by illumination of the control inhibition lamp 19.

At 502, it is determined whether the disconnection abnormality occurs in the relay 14a. The determination is made based on the determination made at 312 of the flowchart shown in FIG. 4 whether the disconnection detection flag indicating the disconnection abnormality of the relay 14a has been set.

If the determination is affirmative, the process proceeds to a processing at 504 where it is determined whether the disconnection abnormality occurs in at least one of the relay 14b and the relay 14c based on the determination made at 324 and 336 of the flowchart shown in FIG. 4 whether the disconnection detection flag indicating the disconnection abnormality in the relays 14b and 14c has been set. That is, if it is determined that the disconnection abnormality occurs in at least one of the relays 14b and 14c, the process proceeds to a processing at 506 where the control inhibition mode is set such that execution of various control routines such as the TCS, ESC, and ABS is inhibited.

The number of relays to be operated is determined depending on the control routine. For example, at least two relays among those 14a to 14c are required to be operated for executing various control routines such as TCS and ESC. The present embodiment is structured to inhibit execution of the control routine if the number of normal relays is smaller than the number required for executing such control routine.

Upon setting the inhibition control mode, execution of various control routines is inhibited, and an illumination command signal is output to the control inhibition lamp 19 so as to be illuminated. The driver will be alerted for the state where the various control routines cannot be executed by the illumination of the control inhibition lamp 19.

If the determination is negative at 504, and setting of the control inhibition mode is terminated at 506, the process proceeds to a processing at 508. At 508, an illumination command signal is output to the alarm lamp 18 under the alarm lamp illumination process. Accordingly, since the alarm lamp 18 is illuminated, the driver can be alerted that the disconnection abnormality has occurred in the relays 14a to 14c. That is, If the determination is negative at 504, it is determined that the relays 14b and 14c are in normal states. It is, thus, possible to execute various control routines. In this case, however, as the disconnection abnormality has occurred in the relay 14a, the alarm lamp 18 is illuminated in the same manner as in the process executed when YES is obtained at 504.

Meanwhile If the determination is negative at 502, the process proceeds to a processing at 510 where it is determined whether the disconnection abnormality has occurred in the relay 14b based on the determination made at 324 of the flowchart shown in FIG. 4 whether the disconnection detection flag indicating the disconnection abnormality in the relay 14b has been set.

If the determination is affirmative at 510, the process proceeds to a processing at 512 where it is determined whether the disconnection abnormality has occurred in the relay 14c based on the determination whether the disconnection detection flag indicating the disconnection abnormality in the relay 14c has been set at 336 of the flowchart shown in FIG. 4.

If the determination is affirmative at 512, it is determined that the disconnection abnormality has occurred in two relays, that is, the relays 14b and 14c, interfering with execution of various control routines. Accordingly, the control inhibition mode is set at 506 where the control inhibition mode is set, and the process proceeds to a processing at 508.

If the disconnection abnormality has occurred in the relay 14b only, the process always proceeds from 512 to 508.

If the determination is negative at 510, the process proceeds to a processing at 514 where it is determined whether the disconnection abnormality has occurred in the relay 14c similar to the processing at 512.

If the determination is affirmative, it is determined that the disconnection abnormality has occurred in the relay 14c only. Although it is considered to be possible to execute various control routines in this case, the process proceeds to a processing at 508 where the illumination command signal is output to the alarm lamp 18 as the disconnection abnormality has occurred in the relay 14c. Meanwhile, If the determination is negative, it is determined that no disconnection abnormality has occurred in the relays 14a to 14c. The process thus proceeds to 516 where it is determined whether the motor relay short-circuit abnormality has occurred based on the determination whether the short-circuit detection flag has been set at 412 of the flowchart of FIG. 5 as aforementioned.

If the short-circuit detection flag has been set, the process proceeds to a processing at 508 where the illumination command signal is output to the alarm lamp 18. On the contrary, if the short-circuit detection flag has not been set, the process ends.

Under the alarm/control inhibition determination control, if the disconnection abnormality has occurred in at least one of the relays 14a to 14c, and if it is determined that the short-circuit abnormality has occurred, the alarm lamp 18 is illuminated so as to alert the driver for the abnormality. In the case where the disconnection abnormality has occurred in some relays among those relays 14a to 14c (two relays in the present embodiment), and accordingly various control routines cannot be executed, the control inhibition lamp 19 is illuminated so as to alert the driver.

The operation state of the embodiment under the aforementioned various control routines will be described referring to the timing charts shown in FIGS. 7 and 8.

Figure 7:
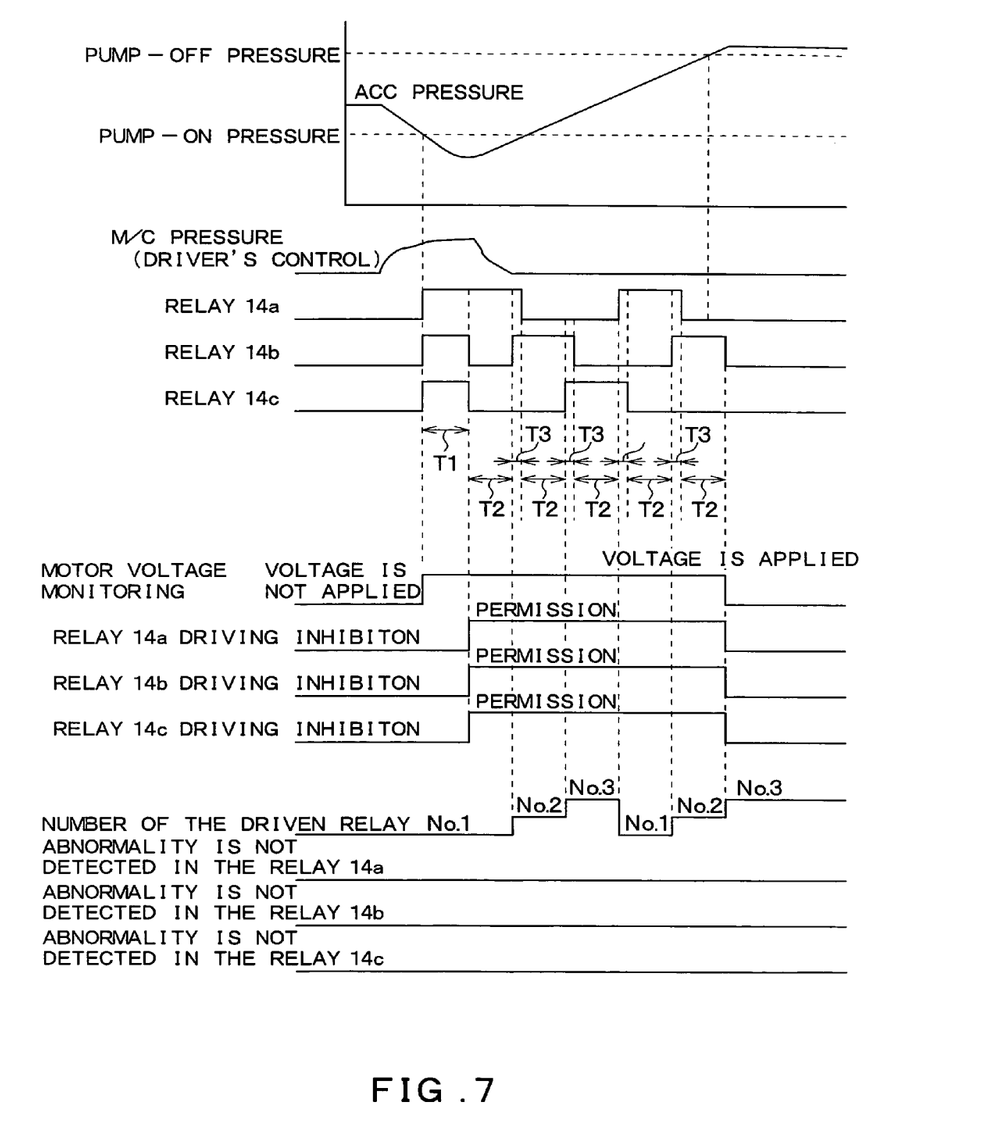
FIG. 7 is a timing chart when all the plurality of relays are normally operated.

FIG. 7 is a timing chart showing the operation state in the case where all the relays 14a to 14c are normally operated. FIG. 8 is a timing chart showing the operation state in the case where the disconnection abnormality has occurred in the relay 14b.

In the case where all the relays 14a to 14c are normally operated, if the Acc pressure of the accumulator 11 becomes equal to or lower than the pump-ON pressure, all the relays 14a to 14c are turned on until an elapse of the first threshold value T1, for example, 350 ms. For the period after the elapse of the first threshold value T1 to the elapse of the second threshold value T1+T2, for example, 350+400 ms, only the relay 14a is turned on, and the rest of the relays 14b, 14c are turned off as the number 1 corresponding to the relay 14a has been set as the initial value of the number of the relay to be driven.

During the aforementioned period, it is detected whether the voltage is applied to the motor 13 by the parallel relay drive CPU 14g via the voltage detection resistor 14i, and it is determined whether the disconnection abnormality has occurred in the relay 14a. The example shown in FIG. 7 indicates that all the relays 14a to 14c are normally operated, and accordingly the disconnection abnormality in the relay 14a is not detected. In spite of the elapse of the aforementioned time period, the driving of the relay 14a is allowed without inhibition.

For the period after the elapse of the second threshold value T1+T2 to the elapse of the third threshold value T1+T2+T3 (350+400+10 ms), the number 2 is set as the number of the relay to be driven, thus turning the relay 14b on. During the aforementioned period, the relays both 14a and 14b are held in on states.

Upon the elapse of the third threshold value T1+T2+T3, the time count is started from T1. Until the elapse of the second threshold value T1+T2, the number 2 is set as the number of the relay to be driven. Accordingly only the relay 14b is turned on, and other relays 14a, and 14c are turned off.

During the aforementioned period, the parallel relay drive CPU 14g detects whether the voltage is applied to the motor 13 via the voltage detection resistor 14i, and it is determined whether the disconnection abnormality has occurred in the relay 14b.

The aforementioned processing will be executed with respect to those relays repeatedly in the order from 14a, 14b and 14c. When each of the relays 14a to 14c is turned on individually, the disconnection abnormality in each of the relays is detected.

As the pump 10 is driven by the motor 13, the Acc pressure of the accumulator 11 increases. When the Acc pressure exceeds the pump-OFF pressure, driving of the relay ends. Accordingly the fluid pressure accumulated in the accumulator 11 is transferred to the servo unit 2 via the pipe 9 such that the servo unit 2 performs its boosting function based on the accumulated fluid pressure.

Further, when the Acc pressure is lower than the pump-ON pressure, only one of the plurality of relays 14a to 14c is sequentially driven in a predetermined order until the Acc pressure becomes equal to or higher than the pump-OFF pressure. Therefore, compared with a case in which only one relay is always driven as a previous relay circuit, it is possible that a heat generation amount is restricted in the plurality of relays 14a to 14c and durability thereof improves.

Figure 8:
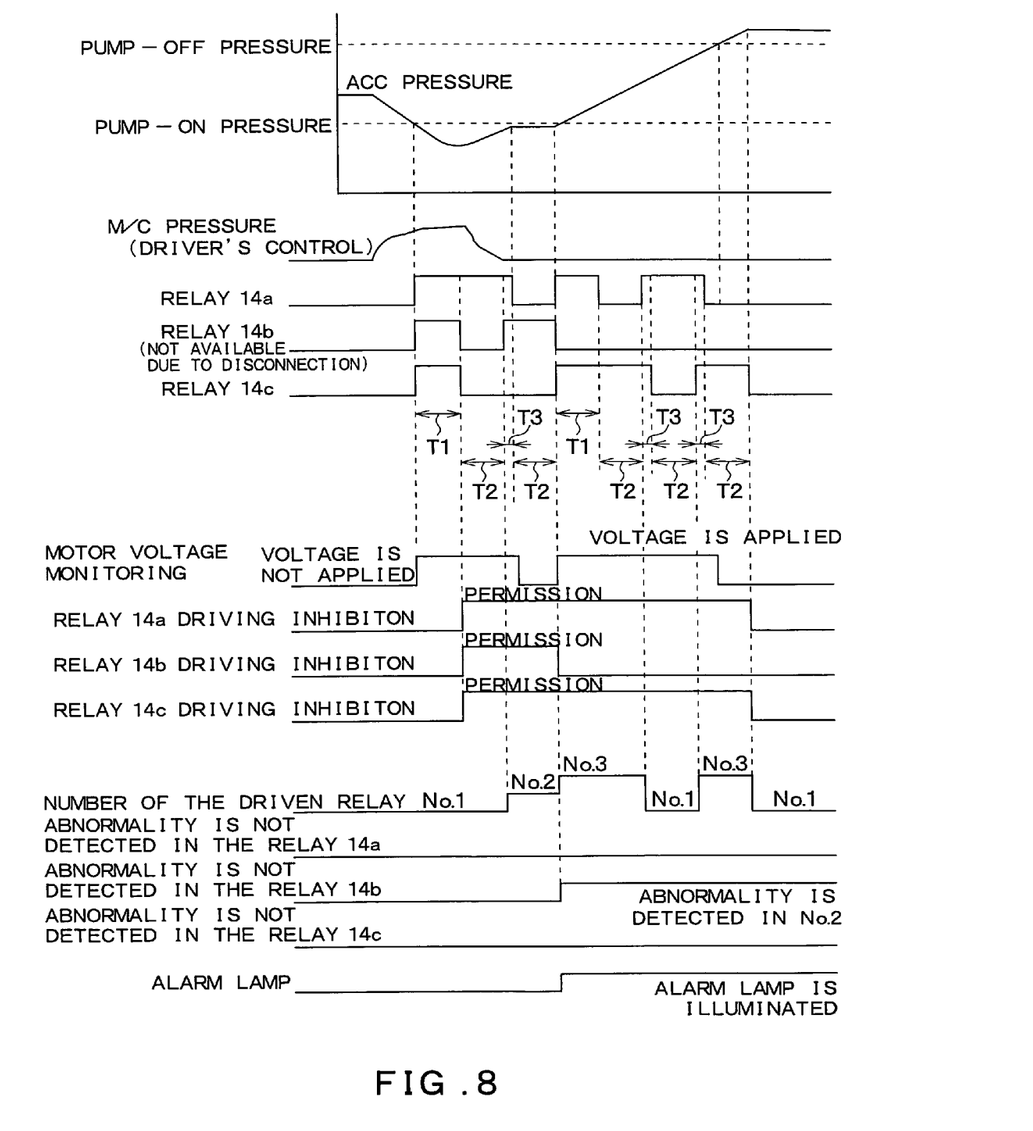
FIG. 8 is a timing chart when one of the relays has a disconnection abnormality.

Meanwhile FIG. 8 is a timing chart showing the operation state in the case where the disconnection abnormality has occurred in the relay 14b among those 14a to 14c. The operation state is represented by the timing chart similar to the one shown in FIG. 7 until the elapse of the third threshold value T1+T2+T3.

When only the relay 14b is turned on subsequently, the voltage is not applied to the motor 13 owing to the disconnection abnormality state of the relay 14b. Thus, ACC pressure is maintained without increasing during the term T2. Accordingly, the parallel relay drive CPU 14g detects that the voltage is not applied to the motor 13 via the voltage detection resistor 14i. It is then detected that the disconnection abnormality has occurred in the relay 14b, and driving of the relay 14b is inhibited.

Thereafter, the relays 14a and 14c are operated to apply voltage to the motor 13 without turning the relay 14b on until the ACC pressure becomes the first threshold value T1 that is a term at which a large amount of electricity is required as the starting current to drive the motor 13, and at the same time the ACC pressure increases again. At the same time, the illumination command signal is output to the alarm lamp 18 so as to be illuminated. Thereafter, the relay 14b and relay 14c are alternately and repeatedly driven until the ACC pressure exceeds the pump OFF pressure.

As has been described, in the parallel relay circuit provided in the hydraulic braking device according to the present embodiment, a plurality of relays 14a to 14c are provided to add the redundancy function to the relay circuit while detecting the disconnection abnormality in each of the relays 14a to 14c, respectively. In the case where the disconnection abnormality has occurred in at least one of those relays 14a to 14c, it is possible to detect such disconnection abnormality as well as alert the driver for the abnormality.

Further, since the various control routines is inhibited in accordance with the disconnection abnormality state of respective relays 14a to 14c, it is possible that a heat generation amount is restricted in the plurality of relays 14a to 14c.

OTHER EMBODIMENTS

In the aforementioned embodiment, the number of relays 14a to 14c in the parallel relay circuit is set to three. However, the number of relays is not limited to three but may be set to an arbitrary value so long as it is equal to or larger than two. In the embodiment, if the abnormality has occurred in two or more relays, various control routines may be inhibited. However, it is to be understood that such number merely shows an example, and it will be determined depending on the control routine to be executed.

In the aforementioned embodiment, the parallel relay drive CPU 14g is provided in the brake ECU. However, the parallel relay drive CPU 14g may be provided independently from the brake ECU.

The voltage detection resistor 14i that detects the disconnection and the short-circuit may be formed as the motor current detection circuit.

The respective flowcharts of the drawings correspond to the respective portions for executing the various control routines.

While the above description is of the preferred embodiments of the present invention, it should be appreciated that the invention may be modified, altered, or varied without deviating from the scope and fair meaning of the following claims.

What is claimed is:

1. A parallel relay circuit in a braking device in which a fluid pressure accumulated in an accumulating unit is detected by a pressure detection unit, and when the fluid pressure detected by the pressure detection unit becomes lower than a first predetermined value, a motor is driven to activate a pump for increasing the fluid pressure accumulated in the accumulating unit such that a boosting function of a servo unit is maintained based on the fluid pressure, the parallel relay circuit comprising:

a plurality of relays each provided in a power supply line to the motor and connected in parallel with one another;

a parallel relay drive unit that controls an operation state of each of the plurality of relays; and a disconnection abnormality detection unit that detects a disconnection abnormality in the plurality of relays based on whether a voltage is supplied to the motor, wherein:

the parallel relay drive unit drives only one of the plurality of relays sequentially in a predetermined order for driving the motor while turning rest of the relays off, the disconnection abnormality detection unit detects the disconnection abnormality of each of the plurality of relays individually by determining whether the voltage is applied to the motor when the one of the relays is driven, the disconnection abnormality detection unit detects the disconnection abnormality of the currently-driven relay by determining whether the voltage is applied to the motor through the currently-driven relay, when the motor is driven upon decrease in the fluid pressure accumulated in the accumulating unit, which is detected by the pressure detection unit to be lower than the first predetermined value, the parallel relay drive unit stops applying the voltage to the motor by turning the plurality of relays off at a timing at which the fluid pressure accumulated in the accumulating unit becomes equal to or higher than a second predetermined value that is higher than the first predetermined value, and drives only one of the plurality of relays sequentially in a predetermined order until the fluid pressure accumulated in the accumulating unit becomes equal to or higher than the second predetermined value, and the parallel relay drive unit only drives the rest of the relays in which the disconnection abnormality is not detected when the disconnection abnormality is detected in one of the plurality of relays.

2. The parallel relay circuit according to claim 1, wherein when the motor is driven upon decrease in the fluid pressure accumulated in the accumulating unit, which is detected by the pressure detection unit to be lower than the first predetermined value, the parallel relay drive unit turns all the plurality of relays on to apply the voltage to the motor until an elapse of a predetermined threshold value from a time at which the fluid pressure becomes lower than the first predetermined value, and the parallel relay drive unit turns only one of the relays on and the rest of the relays off after the elapse of the predetermined threshold value.

3. The parallel relay circuit according to claim 2, wherein:
the parallel relay drive unit stops applying the voltage to the motor by turning the plurality of relays off when the fluid pressure accumulated in the accumulating unit becomes equal to or higher than a second predetermined value, and includes a memory unit that stores one of the plurality of relays each designated with a corresponding number, which has been detected with respect to the disconnection abnormality; and
the memory unit stores the number of the relay that has been detected with respect to the disconnection abnormality in the last time when the fluid pressure becomes equal to or higher than the second predetermined value, and the relay with the number next to the number that has been stored in the memory unit is detected with respect to the disconnection abnormality subsequently when the fluid pressure becomes lower than the first predetermined value.

4. The parallel relay circuit according to claim 3, wherein the parallel relay drive unit drives one of the plurality of relays having the disconnection abnormality detected, and a next one of the plurality of relays to have the disconnection abnormality detected subsequently for a period for which the one and the next one of the plurality of relays have the disconnection abnormality detected.

5. The parallel relay circuit according to claim 2, wherein the parallel relay drive unit drives one of the plurality of relays having the disconnection abnormality detected, and a next one of the plurality of relays to have the disconnection abnormality detected subsequently for a period for which the one and the next one of the plurality of relays have the disconnection abnormality detected.

6. The parallel relay circuit according to claim 1, wherein:
the parallel relay drive unit stops applying the voltage to the motor by turning the plurality of relays off when the fluid pressure accumulated in the accumulating unit becomes equal to or higher than a second predetermined value, and includes a memory unit that stores one of the plurality of relays each designated with a corresponding number, which has been detected with respect to the disconnection abnormality; and
the memory unit stores the number of the relay that has been detected with respect to the disconnection abnormality in the last time when the fluid pressure becomes equal to or higher than the second predetermined value, and the relay with the number next to the number that has been stored in the memory unit is detected with respect to the disconnection abnormality subsequently when the fluid pressure becomes lower than the first predetermined value.

7. The parallel relay circuit according to claim 6, wherein the parallel relay drive unit drives one of the plurality of relays having the disconnection abnormality detected, and a next one of the plurality of relays to have the disconnection abnormality detected subsequently for a period for which the one and the next one of the plurality of relays have the disconnection abnormality detected.

8. The parallel relay circuit according to claim 1, wherein the parallel relay drive unit drives one of the plurality of relays having the disconnection abnormality detected, and a next one of the plurality of relays to have the disconnection abnormality detected subsequently for a period for which the one and the next one of the plurality of relays have the disconnection abnormality detected.

9. The parallel relay circuit according to claim 1, wherein the disconnection abnormality detection unit detects the disconnection abnormality by determining whether the voltage reaches a predetermined threshold voltage when each of the plurality of relays are driven.

10. The parallel relay circuit according to claim 9, wherein the disconnection abnormality detection unit determines that the disconnection abnormality is present when a number of the plurality of relays for which the voltage does not reach the predetermined voltage when selected meets or exceeds a predetermined value.

11. A braking device comprising:
an accumulating unit that accumulates a fluid pressure;
a servo unit that performs a boosting function based on the fluid pressure accumulated in the accumulating unit;
a pressure detection unit that detects the fluid pressure accumulated in the accumulating unit;
a pump that feeds a fluid to the accumulating unit;
a motor that drives the pump;
a plurality of relays provided in a power supply line to the motor and each connected with one another;
a parallel relay drive unit that turns the plurality of relays on when the fluid pressure detected by the pressure detection unit becomes lower than a first predetermined value for driving the pump by applying voltage to the motor so as to increase the fluid pressure accumulated in the accumulating unit;
a brake fluid pressure generation source that generates a brake fluid pressure based on the boosting function of the servo unit;
a braking force generation unit that generates a braking force to be applied to each wheel;
a brake fluid pressure control unit that transfers the brake fluid pressure for generating the braking force to the braking force generation unit based on the brake fluid pressure generated by the brake fluid pressure generation source; and
a disconnection abnormality detection unit that detects a disconnection abnormality of the plurality of relays based on a state of application of the voltage to the motor,
wherein the parallel relay drive unit drives only one of the plurality of relays sequentially in a predetermined order for driving the motor while turning rest of the relays off,
wherein the disconnection abnormality detection unit detects the disconnection abnormality of the currently-driven relay by determining whether the voltage is applied to the motor through the currently-driven relay,
wherein when the motor is driven upon decrease in the fluid pressure accumulated in the accumulating unit, which is detected by the pressure detection unit to be lower than the first predetermined value, the parallel relay drive unit stops applying the voltage to the motor by turning the plurality of relays off at a timing at which the fluid pressure accumulated in the accumulating unit becomes equal to or higher than a second predetermined value that is higher than the first predetermined value, and drives only one of the plurality of relays sequentially in a predetermined order until the fluid pressure accumulated in the accumulating unit becomes equal to or higher than the second predetermined value, wherein when the brake fluid pressure control unit adjusts the brake fluid pressure, based on which the braking force generation unit generates the braking force so as to execute a vehicle control in accordance with a vehicle condition, the braking device further comprises a control inhibition display unit that displays a state where an execution of the vehicle control is inhibited when the disconnection abnormality detection unit detects the disconnection abnormality in one of the relays, and a number of the relays which have been detected as having no disconnection abnormality becomes smaller than a predetermined number of the relays required for executing the vehicle control, and wherein the parallel relay drive unit only drives the rest of the relays in which the disconnection abnormality is not detected when die disconnection abnormality is detected in one of the plurality of relays.

12. The braking device according to claim 11, further comprising a disconnection display unit which displays that the disconnection abnormality in one of the plurality of relays has been detected by the disconnection abnormality detection unit.

13. The braking device according to claim 12, wherein when the brake fluid pressure control unit adjusts the brake fluid pressure, based on which the braking force generation unit generates the braking force so as to execute a vehicle control in accordance with a vehicle condition, the braking device further comprises a control inhibition display unit that displays a state where an execution of the vehicle control is inhibited when the disconnection abnormality detection unit detects the disconnection abnormality in one of the relays, and a number of the relays which have been detected as having no disconnection abnormality becomes smaller than a predetermined number of the relays required for executing the vehicle control.

* * * * *